(12) United States Patent
Moroni et al.

(10) Patent No.: US 6,421,472 B1
(45) Date of Patent: Jul. 16, 2002

(54) ATHERMALIZED POLYMER OVERCLAD INTEGRATED PLANAR OPTICAL WAVEGUIDE DEVICE AND METHOD

(75) Inventors: Marc Moroni, Melun; Sophie Vallon, Fontainebleau, both of (FR)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/549,255

(22) Filed: Apr. 14, 2000

(51) Int. Cl.$^7$ ................................. G02B 6/12
(52) U.S. Cl. ................... 385/14; 385/129; 385/130; 385/131; 385/132; 385/24; 385/37; 359/124; 359/130
(58) Field of Search ................. 385/129, 130, 385/131, 132, 24, 37; 359/124, 130, 161

(56) References Cited

U.S. PATENT DOCUMENTS

| | | | |
|---|---|---|---|
| 4,985,308 A | | 1/1991 | Squire |
| 5,062,680 A | * | 11/1991 | Imamura ............. 385/131 |
| 5,136,682 A | * | 8/1992 | Moyer ............. 385/141 |
| 5,235,662 A | * | 8/1993 | Prince ............. 385/129 |
| 5,799,118 A | | 8/1998 | Ogusu et al. |
| 5,857,039 A | * | 1/1999 | Bosc ............. 385/14 |
| 5,861,976 A | * | 1/1999 | Hoekstra ............. 359/288 |
| 6,002,823 A | * | 12/1999 | Chandross ............. 385/50 |
| 6,118,909 A | * | 9/2000 | Chen ............. 385/15 |
| 6,169,838 B1 | | 1/2001 | He et al. |
| 6,229,949 B1 | * | 5/2001 | Ido ............. 385/132 |
| 6,256,442 B1 | * | 7/2001 | Nolan ............. 385/129 |

FOREIGN PATENT DOCUMENTS

| WO | WO 99/21038 | 4/1999 |
|---|---|---|
| WO | WO 00/28355 | 5/2000 |

OTHER PUBLICATIONS

Y.Kokubun et al., "Temperature–independent optical filter at 1.55 microns wavelength using a silica based athermal waveguide", Elect. Lett. 34(4), pp. 367–368, 1998.*

Y.Kokubun et al., "temperature–independent narrowband optical filter at 1.3 microns wavelength by an athermal waveguide", Electronics Letters, 32(21), Oct. 1996, pp. 1998–2000.*

Inoue et al. "Athermal silica–based arrayed–waveguide grating multiplexer", Electronics Letters, vol. 33, No. 23, pp. 1945–1947, Nov. 6, 1997.

Bosc et al. "Temperature and polarisation insensitive Bragg gratings realised on silica waveguide on silicon", Electronics Letters, vol. 33, No. 2, pp. 134–136, Jan. 16, 1997.

Kokubun et al. "Athermal Waveguides for Temperature–Independent Lightwave Devices", IEEE Photonics Technology Letters, vol. 5, No. 11, pp. 1297–1300, Nov. 1993.

Kokubun et al. "Temperature–independent optical filter at 1.55 μm wavelength using a silica–based athermal waveguide", Electronics Letters, vol. 34, No. 4, pp. 367–369, Feb. 19, 1998.

Kokubun et al. "Three–dimensional athermal waveguides for temperature independent lightwave devices", Electronics Letters, vol. 30, No. 15, pp. 1223–1224, Jul. 21, 1994.

Watanabe et al. "Polymeric arrayed–waveguide grating multiplexer with wide tuning range", Electronics Letters, vol. 33, No. 18, pp. 1547–1548, Aug. 28, 1997.

* cited by examiner

*Primary Examiner*—Cassandra Spyrou
*Assistant Examiner*—Leo Boutsikaris
(74) *Attorney, Agent, or Firm*—Philip G. Alden; James V. Suggs

(57) ABSTRACT

An athermalized, polymer overclad integrated optical device (with a multiplexer/demultiplexer or a Mach-Zender interferometer being representative examples) in which thermally-induced shifts in channel wavelengths are minimized. The device includes a doped silica waveguide core on a planar substrate and a polymer overclad having a negative variation in refractive index versus temperature (dn/dT) to inhibit shifts in the channel wavelengths.

55 Claims, 7 Drawing Sheets

5FS

3FEMA

GMA

GlyMo

MPMo

ATHERMALIZED POLYMER OVERCLAD INTEGRATED PLANAR OPTICAL WAVEGUIDE DEVICE AND METHOD

BACKGROUND OF THE INVENTION

1. Field of the Invention

The present invention relates to integrated or "planar" optical waveguide devices, and particularly to "athermal" devices in which the light-transmitting properties are generally insensitive to temperature fluctuations.

2. Technical Background

Integrated or "planar" optical waveguide devices, such as integrated optical circuits, combine miniaturized waveguides and optical devices into a functional optical system incorporated onto a small planar substrate. Such integrated optical waveguide devices are utilized in optical communications systems, usually by attaching optical waveguide fibers that transmit light signals to the integrated optical waveguide device as inputs and outputs. The integrated optical waveguide device performs one or more functions or processes on the transmitted light. Such devices provide good performance at consistent standard room temperatures, but exhibit poor performance when used in environments where they are exposed to thermal variations or fluctuations. The wavelength channels processed by the integrated optical waveguide device tend to shift with changes in operating temperatures. Integrated optical devices which incorporated optical path length differences can be used as wavelength multiplexing and demultiplexing devices. Such integrated optical devices are particularly useful as a wavelength division multiplexer/demultilexers, and may incorporate a phased array made from a plurality of different waveguide core arms which have differences in optical path length.

It has been found that the use of integrated optical waveguide devices is limited by their temperature dependence. In such integrated devices, thermal channel wavelength shifts of greater than 0.10 nm/° C. at a transmitting wavelength in the 1550 nm range can limit their usefulness in environments of differing temperature. Presently, the application of such integrated optical waveguide devices has been hindered by the requirement to consistently maintain the temperature of the device such as by actively heating or cooling the device. While such costly and energy consuming heating and cooling may suffice in a laboratory setting, there is a need for an integrated optical waveguide device that is manufacturable and can be deployed in the field and operate properly when subjected to temperature changes.

SUMMARY OF THE INVENTION

The present invention is directed to an integrated optical waveguide device that substantially obviates one or more of the problems due to the limitations and disadvantages of the related art. The present invention provides an athermalized polymer overclad integrated planar optical waveguide circuit device which inhibits the shifting of channel wavelengths due to variations in operating temperature within a predetermined operating temperature range. In a preferred embodiment the invention provides an athermalized phased array wavelength division multiplexer/demultiplexer.

Additional features and advantages of the invention will be set forth in the description which follows, and in part will be apparent from the description or may be learned by practice of the invention. The objectives and other advantages of the invention will be realized and attained by the apparatus, compositions, and methods particularly pointed out in the written description and claims hereof as well as the appended drawings.

To achieve these and other advantages and in accordance with the purpose of the invention, as embodied and broadly described, the invention provides an integrated optical waveguide circuit device that includes a doped silica waveguide circuit core supported on a planar substrate. The planar substrate is a solid flat substrate (such as a silica wafer or a silicon wafer) which may further include an underclad or buffer layer (such as an undoped or lightly doped silica layer). The doped silica waveguide circuit core has a first waveguide path and at least a second waveguide path, wherein the waveguide paths have a difference of $\Delta L$ of path length that is selected to provide an optical path difference which corresponds to suitable channel wavelengths $\lambda$ in the range of 1500–1600 nm and to a suitable free spectral range (with respect to the number of channels and to the channel spacing). The device includes a polymer overclad which clads the doped silica waveguide circuit core. The polymer overclad covers and encapsulates the waveguide circuit core, wherein light guided by the circuit core, the polymer overclad, and the planar substrate propagates in the circuit core, the polymer overclad and the planar substrate with the polymer overclad having a negative variation in refractive index versus temperature (dn/dT). The polymer overclad is selected such that the polymer overclad's negative variation in refractive index versus temperature (dn/dT) restricts the shift in the channel wavelength $\lambda$ to less than 0.1 nm when the device is subjected to a temperature variation within the operating range of 0° to 70° C. In a preferred embodiment the device is a wavelength division multiplexer/demultiplexer with the waveguide paths forming a phased array.

In another aspect, the invention includes an athermalized integrated optical phased array wavelength division multiplexer/demultiplexer having a doped silica waveguide core on a planar substrate that is overclad with a polymer overclad comprised of fluorinated monomers.

In a further aspect, the invention comprises a method of making an optical waveguide wavelength division multiplexer/demultiplexer device. The method includes the steps of providing a planar substrate, and forming a doped silica waveguide core on the planar substrate with the waveguide core incorporating an optical path length difference which corresponds to a channel wavelength $\lambda$ in the wavelength range of 1500–1600nm. The method further includes overcladding the doped silica waveguide core with a polymer overclad having a negative variation in refractive index versus temperature (dn/dT), wherein the polymer overclad inhibits the shift of the channel wavelength $\lambda$ when the device is subjected to a variation in temperature.

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE PREFERRED EMBODIMENTS

The invention comprises an integrated optical waveguide circuit device having a doped silica waveguide circuit core on a planar substrate.

Reference will now be made in detail to the present preferred embodiments of the invention, examples of which are illustrated in the accompanying drawings.

Figure 1:
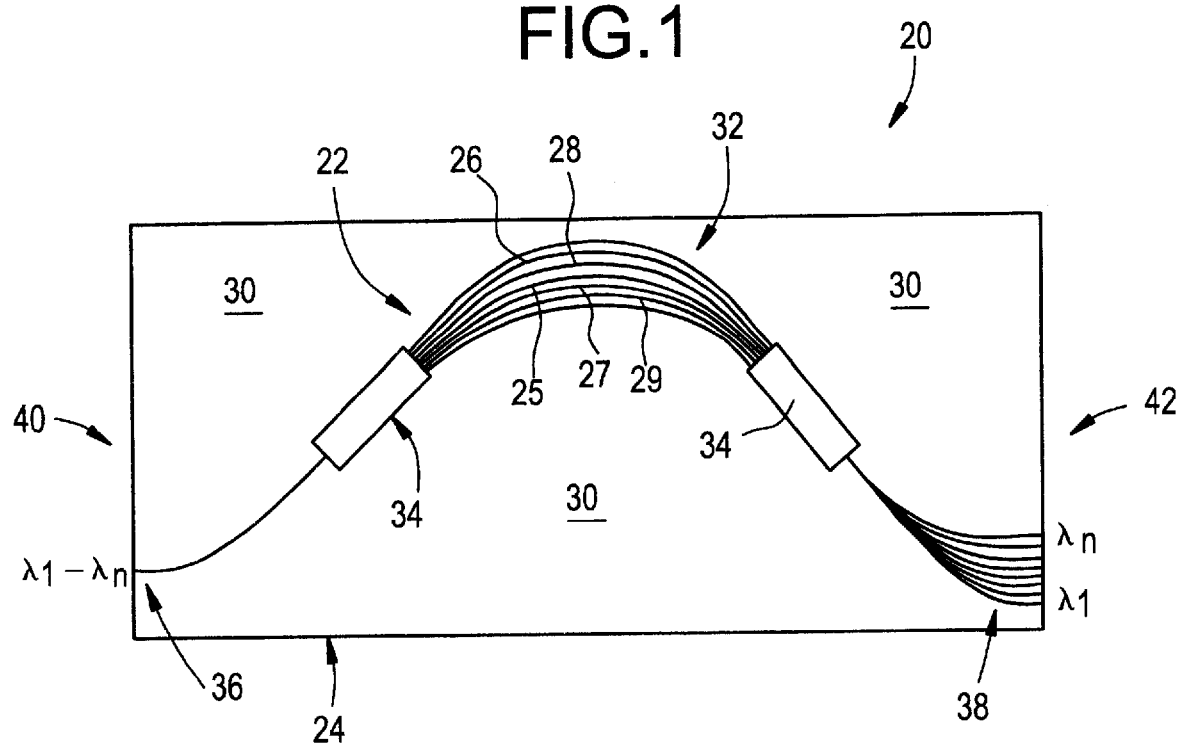
FIG. 1 is a schematic top-view of an integrated optical waveguide circuit phased array wavelength division multiplexer/demultiplexer device embodying the invention.

The exemplary embodiment of the integrated optical waveguide circuit device is shown in FIG. 1 and is designated generally by reference numeral 20.

As embodied herein and referring to FIG. 1, integrated optical waveguide circuit device 20 includes a doped silica waveguide circuit core 22, with silica waveguide circuit core 22 on a planar substrate 24, preferably a flat planar silica substrate, such as a fused silica member, or a silicon wafer with a silica buffer layer. In the preferred embodiment integrated optical waveguide circuit device 20 is a phased array wavelength division multiplexer/demultiplexer with circuit core 22 having a phased array of waveguide paths. FIG. 1 illustrates the inventive integrated optical waveguide circuit phased array wavelength division multiplexer/demultiplexer with the actual device having more waveguides in terms of inputs, outputs and phased array waveguide paths.

Silica waveguide circuit core 22 is comprised of a first waveguide path 26 and at least a second waveguide path 28 which is preferably adjacent and substantially parallel. Adjacent waveguide paths, such as first waveguide path 26 and second waveguide path 28, have a path length difference $\Delta L$ that is selected to provide a suitable optical path difference. The optical path difference is selected to correspond to suitable channel wavelengths $\lambda$ in the range of 1500–1600 nm and to a suitable free spectral range. A polymer overclad 30 clads silica waveguide circuit core 22. Polymer overclad 30 encapsulates silica waveguide circuit core 22 supported by planar substrate 24 wherein light guided by silica waveguide circuit core 22, polymer overclad 30, and planar substrate 24 propagates in silica waveguide circuit core 22, polymer overclad 30, and planar substrate 24.

Polymer overclad 30 has a negative variation of refractive index versus temperature (dn/dT), and is selected such that the polymer overclad dn/dT inhibits the shift of channel wavelength $\lambda$ to less than 0.10 nm, preferably less than 0.05 nm when device 20 is subjected to temperature variations in the range of 0° to 70° C. Preferably polymer overclad 30 and the negative variation of refractive index versus temperature dn/dT is selected to inhibit shifts of channel wavelength $\lambda$ to less than 0.01 nm.

Figure 2:
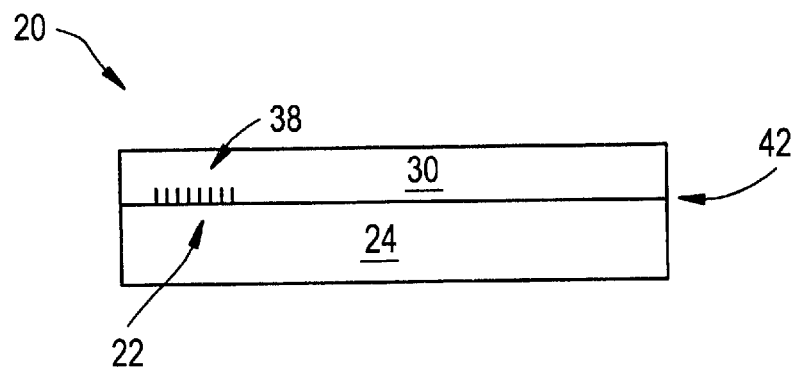
FIG. 2 is a right side view of the device of FIG. 1.
Figure 3:
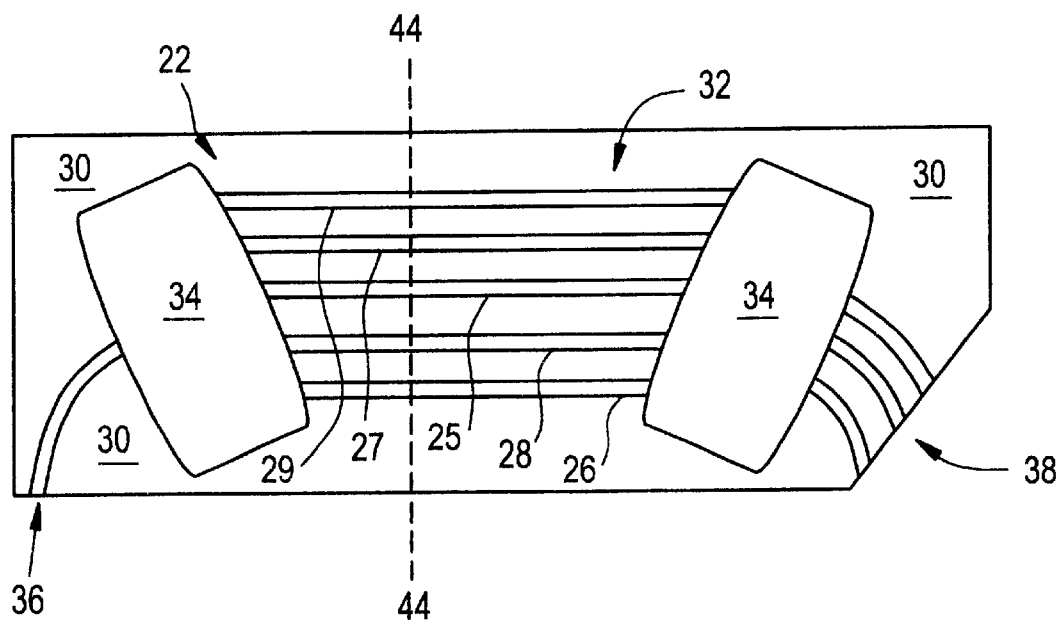
FIG. 3 is an integrated optical waveguide circuit phased array wavelength division multiplexer demultiplexer device embodying the invention.
Figure 4:
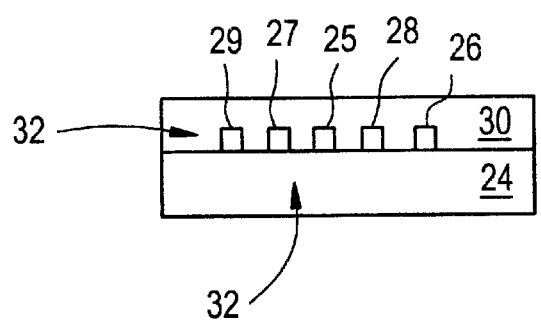
FIG. 4 is a cross section left side view of FIG. 3 along dotted line 44.

As shown in FIG. 1 and FIG. 2, optical waveguide device 20 is an integrated wavelength division multiplexer/demultiplexer which includes a phased array 32 comprised of a plurality of waveguide paths, including waveguide paths 26 and 28. A limited number of waveguide paths in phased array 32 is shown to preserve the clarity of the drawing, and the present invention encompasses a phased array of 10s of waveguide paths, with the phased arrays having upwards of 100 waveguide paths. In FIG. 1, from left side 40 to right side 42, integrated optical waveguide circuit phased array wavelength division multiplexer/demultiplexer 20 functions as a demultiplexer. A wavelength multiplexed signal is inputted into device 20, via input waveguide 36, with the multiplexed signal comprised of multiple wavelengths $\lambda$, depicted in FIG. 1 as $\lambda_1$ through $\lambda_n$. Coupler region 34 couples the multiple wavelength signal into the waveguide paths of phased array 32. The plurality of waveguide paths in phased array 32 are preferably substantially parallel as depicted and adjacent to each other. The phased array waveguide paths have a path length difference $\Delta L$ that is selected to provide an optical path difference which corresponds to the channel wavelengths $\lambda$ of the multiple wavelength channels. Phased array 32 demultiplexes (separates) the wavelengths $\lambda_1$ through $\lambda_n$ such that they are coupled through second coupler 34 into their individual channel wavelength $\lambda$ output waveguides 38 that exit at right side 42. As shown in FIG. 2, which is the right side view of device 20 of FIG. 1, polymer overclad 30 encapsulates and surrounds doped waveguide circuit core 22. As shown in FIGS. 1–4, polymer overclad 30 encapsulates in that it completely covers and coats silica waveguide circuit core 22, except for that bottom portion of circuit core 22 that is in contact with planar substrate 24. Phased array 32 in FIG. 3 shows first through fifth waveguide paths 26, 28, 25, 27, and 29. As shown in FIG. 4, which is a cross section view along dotted line 44, polymer overclad 30 encapsulates phased array 32 of circuit core 22 (all of the waveguide paths of phased array 32), and additionally is in contact with planar substrate 24.

Polymer overclad 30 should have a polymer overclad dn/dT in the range of $-4 \times 10^{-4}$ °C.$^{-1}$ to $-5 \times 10^{-5}$ °C.$^{-1}$ at 1550 nm between 0° and 70° C., and preferably $-1.5 \times 10^{-4}$ °C.$^{-1}$ to $-5 \times 10^{-5}$ °C.$^{-1}$. In a preferred embodiment of the invention polymer overclad 30 has a polymer overclad dn/dT in the range of $(-1.0 \pm 0.2) \times 10^{-4}$ °C.$^{-1}$ at 1550 nm. Additionally, polymer overclad 30 has a refractive index (n) at 1550 nm, 20° C., in the range of 1.35 up to an index slightly below the core index. Preferably the refractive index (n) at 1550 nm, 20° C. is less than 1.48. The precise range of index useful for athermalizing device 20 depends on parameters such as core index, core dn/dT and core dimensions. In particular, the upper limit is determined by losses in curved waveguides and depends on the radius of curvature of waveguide circuit core 22. In a preferred embodiment, core index is 1.455±0.002 at 1550 nm, 20° C., with core dn/dT assumed to be equal to that of silica ($10^{-5°}$ $C^{-1}$), and core dimensions are about 6×6.5 μm. In this case, the refractive index of polymer overclad 30 is in the range of 1.430 to 1.450 at 1550 nm, 20° C., most preferably between 1.430 and 1.442 at 1550 nm, 20° C. Further, the inventive polymer overclad 30 is a low loss optical polymer having an absorption coefficient of less than 2 $cm^{-1}$ at 1550 nm Polymer overclad 30 has a glass transition temperature (Tg) that is selected to be out of the operating temperature working range, preferably with Tg greater than 80° C., most preferably with Tg greater than 85° C. Polymer overclad 30 is an index stable optical polymer which exhibits an index variation less than $10^{-3}$, preferably less than $10^{-4}$, after exposure to humidity of 85% RH at 85° C., and/or of 90% RH at 75° C. during two weeks [85% (at 85° C.) to 90% (at 75° C.)], and after exposure to temperature variations from −40 to 85° C. (10 cycles). Additionally polymer overclad is adherent to silica waveguide circuit core and remains adherent to the silica waveguide circuit core after exposure to humidity of 85% RH at 85° C., and/or of 90% RH at 75° C. weeks [85% (at 85° C.) to 90% (at 75° C.)] during two weeks, and after exposure to temperature variations from −40 to 85° C. (10 cycles).

Inventive polymer overclad 30 is comprised of copolymers containing fluorinated monomers, preferably wherein the fluorinated monomers are selected from the vinylic, acrylic, methacrylic or allylic families (group consisting of vinylics, acrylics, methacrylics and allyics), also the copolymers containing fluorinated monomers are preferably synthesized with a free-radical process (thermally-induced or photo-induced). Polymer overclad 30 could be comprised of polymers or copolymers containing other families such as fluorodioxole. If the refractive index of the core material is higher than 1.5 at 1550 nm (with a different doping of the core material), new families could be used such as fluorinated polyimides. Pentafluorostyrene (5FS) and trifluoroethylmethacrylate (3FEMA) are the preferred fluorinated monomers of polymer overclad 30.

Based on the monomer batch reaction mixture, polymer overclad 30 is comprised of 15–70 wt. % pentafluorostyrene (5FS) and 30–85 wt. % trifluoroethylmethacrylate (3FEMA).

Polymer overclad 30 is improved when it contains a difunctional methacrylate-epoxy monomer, particularly when the difunctional methacrylate-epoxy monomer is glycidyl methacrylate (GMA). The difunctional methacrylate-epoxy monomer provides for cationical and/or thermal cross-linking of the copolymers after polymer overclad 30 has been deposited in solution over doped waveguide core 22 and planar substrate 24.

Figure 5A:
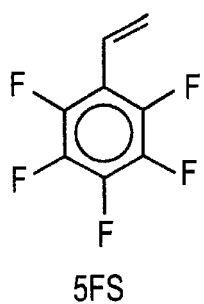
FIG. 5a is a drawing of the monomer unit pentafluorostyrene (5FS)
Figure 5B:
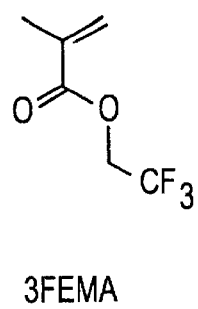
FIG. 5b is a drawing of the monomer unit trifluoroethylmethacrylate (3FEMA)
Figure 5C:
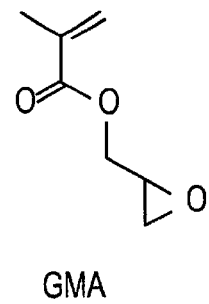
FIG. 5c is a drawing of the difunctional monomer unit glycidyl methacrylate (GMA)
Figure 5D:
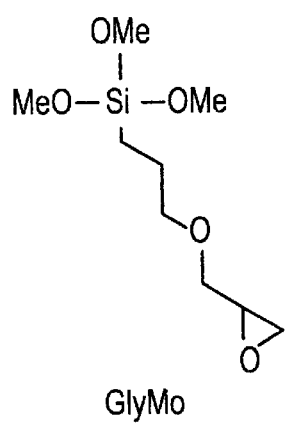
FIG. 5d is a drawing of the adhesion promoter glycidoxypropyl trimethoxysilane (GlyMo)
Figure 5E:
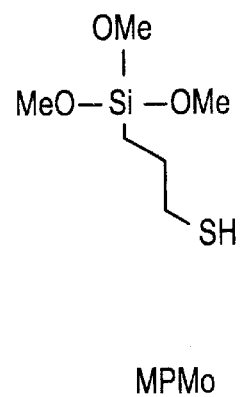
FIG. 5e is a drawing of the adhesion promoter mercaptopropyl trimethoxysilane (MPMo)

An improved polymer overclad 30 is also obtained when using the adhesion promoter glycidoxypropyl trimethoxy silane (GlyMo) or the adhesion promoter mercaptopropyl trimethoxy silane (MPMo). The overclad is improved when the core and the substrate surfaces are treated with GlyMo or by MPMo. The silanization process of the core and the substrate surfaces is obtained by dipping in a GlyMo solution or in a MPMo solution or by chemical vapor deposition of GlyMo or MPMo. Alternatively, the polymer overclad 30 can be improved when polymer overclad 30 includes GlyMo. FIG. 5a is a molecular drawing of the fluorinated monomer pentafluorostyrene (5FS). FIG. 5b is a molecular drawing of the fluorinated monomer trifluoroethylmethacrylate (3FEMA). FIG. 5c is a molecular drawing of the difunctional methacrylate-epoxy monomer glycidyl methacrylate (GMA). FIG. 5d is a molecular drawing of the component glycidoxypropyl trimethoxy silane (GlyMo). FIG. 5e is a molecular drawing of the component mercaptopropyl trimethoxy silane (MPMo).

The preferred batch reaction mixture of the invention is comprised of (30–65 wt. %) trifluoroethylmethacrylate (3FEMA), (20–65 wt. %) pentafluorostyrene (5FS) and (5–15 wt. %) glycidyl methacrylate (GMA). The preferred free-radical initiator is (0.1–5 wt. %) 4,4' azobis (4-cyanovaleric acid) (ADVN) overall monomer concentration in THF.

The invention further comprises an athermalized optical waveguide device 20 which includes a doped silica waveguide core 22 on a planar substrate 24 and a polymer overclad 30 comprised of pentafluorostyrene (5FS) and trifluoroethylmethacrylate (3FEMA). Preferably the optical waveguide device 20 is a wavelength division multiplexer/demultiplexer, which most preferably utilizes a phased array of waveguide paths.

The composition of overclad 30 preferably further includes glycidyl methacrylate (GMA), 4, 4' azobis (4-cyanovaleric acid) (ADVN), and glycidoxypropyl trimethoxysilane (GlyMo). The (5FS) and (3FEMA) containing compositions of the invention provide a polymer overclad 30 which has a refractive index in the range of about 1.430–1.442 at 1550 nm, 20° C. The polymer overclad dn/dT should be in the range of $-4 \times 10^{-4°}$ $C.^{-1}$ to $-5 \times 10^{-5°}$ $C.^{-1}$ at 1550 nm between 0° and 70° C., and preferably $-1.5 \times 10^{-4°}$ $C.^{-1}$ to $-5 \times 10^{-5°}$ $C^{-1}$. In a preferred embodiment, the polymer overclad has a dn/dT of about $(-1.0 \pm 0.2) \times 10^{-4°}$ $C.^{-1}$ at 1550nm. Preferably polymer overclad 30 has a Tg above 85° C., and surrounds and is adhered to the core except where the core is supported by the planar substrate.

The invention further includes a method of making an optical waveguide device 20 which includes the steps of providing a planar substrate 24 and forming a doped silica waveguide core 22 on the substrate with the core incorporating an optical path length difference which corresponds to a channel wavelength λ in the 1500–1600 nm range. The method further includes the step of overcladding the doped silica waveguide core with a polymer overclad 30 which has a negative variation of refractive index versus temperature dn/dT wherein the overclad inhibits the shift of channel wavelength λ when the device is subjected to a variation in temperature.

The inventive step of overcladding the doped silica waveguide core with a polymer overclad further comprises encapsulating doped silica waveguide with the polymer overclad. As shown in FIGS. 1–4 it is preferred to encapsulate the core 22 with polymer overclad 30 so that the core is completely covered, and additionally the planar surface of substrate 24 is covered. The polymer overclad dn/dT should be in the range of $-4 \times 10^{-4°}$ $C.^{-1}$ to $-5 \times 10^{5°}$ $C^{-1}$ at 1550 nm between 0° and 70° C. Preferably the step of overcladding the doped silica waveguide with a polymer overclad includes overcladding with a polymer overclad 30 having a dn/dT in the range of $-1.5 \times 10^{4°}$ $C.^{-1}$ to $-5 \times 10^{-5°}$ $C^{-1}$ at 1550 nm, preferably about $(-1.0 \pm 0.2) \times 10^{-4°}$ $C.^{-1}$ at 1550nm, so that shifts of the channel wavelength λ are minimized. Additionally the step of overcladding the doped silica waveguide core with a polymer overclad preferably includes overcladding the doped silica waveguide with a polymer overclad having a refractive index in the range of about 1.430–1.442 at 1550 nm, 20° C., and the polymer overclad should have a low absorption coefficient in the range of 0.2 cm$^{-1}$ at 1550 nm. It is preferred that polymer overclad 30 has a Tg greater than 80° C. Such a Tg provides for beneficial use of the method and the device produced.

The inventive method of making an athermalized optical waveguide device is particularly suited for making an integrated optical phased array wavelength division multiplexer/demultiplexer and as such the step of forming a doped silica waveguide core on the planar substrate further comprises forming a phased array of optical paths, preferably a plurality of substantially parallel optical paths that have different optical path lengths.

The inventive method includes the step of providing polymer overclad 30, which is then applied to core 22 and substrate 24 in order to inhibit the thermally induced shifts of the channel wavelengths. The providing of polymer overclad 30 includes synthesizing a copolymer composition containing fluorinated monomers, preferably via a free-radical process, and also includes adding a difunctional methacrylate-epoxy monomer to the synthesized copolymer composition. Such a monomer provides for cross linking of the copolymers after the polymer overclad composition is applied in a solution over core 22.

Additionally synthesizing the copolymer composition of polymer overclad 30 comprises synthesizing in a THF (tetrahydrofuran) solution with 4, 4' azobis (4-cyanovaleric acid) (ADVN) as a free-radical initiator. This lowers the polymerization temperature and avoids undesired early cross-linking of the composition. Improved adhesion and durability of the core-overclad interface is achieved when adhesion promoter GlyMo or MPMo are used to treat the core and substrate surface or when GlyMo is added to polymer overclad 30 before overcladding doped silica waveguide core 22. Addition of the adhesion promoters GlyMo or MPMo prior to application reduces the sensitivity to hydrolysis. The preferred polymer overclad of the invention is comprised of pentafluorostyrene (5FS), trifluoroethylmethacrylate (3FEMA), glycidyl methacrylate (GMA), with 4, 4' azobis (4-cyanovaleric acid) (ADVN) as a polymerization initiator. Additionally this composition is provided in a solution with AcOEt (ethyl acetate), for overclad 30 application to core 22 on planar substrate 24. The solution is applied by a liquid phase solution deposition to core 22, such as by spin coating, dip coating or dropping the solution and evaporation of the solvent.

The wavelength division multiplexer/demultiplexer of the invention requires a precise control of the optical path difference between adjacent waveguide paths of the phased array. The optical path difference (OPD) can be expressed as n×ΔL, where n is the effective index of the fundamental mode in the optical waveguide path and ΔL is the physical path length difference between adjacent waveguide paths. The central wavelength λ of device 20's channels is determined by mλ=OPD=n×ΔL, where m is an integer.

The variation of channel wavelength is expressed in the following equation, where λ is the channel wavelength and T the temperature:

$$\frac{d\lambda}{dT} = \lambda \left( \frac{1}{n} \times \frac{dn}{dT} + \frac{1}{\Delta L} \times \frac{d\Delta L}{dT} \right)$$

Figure 6A:
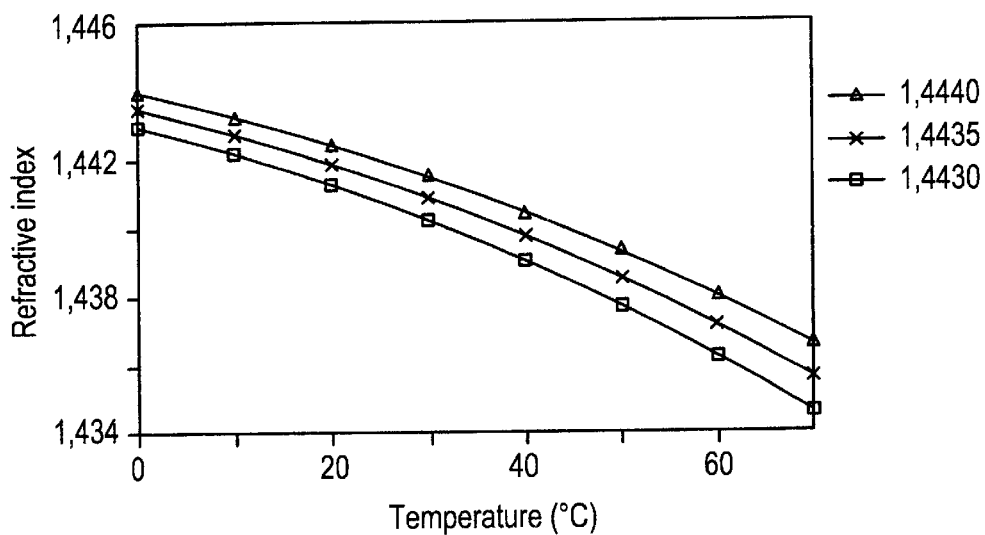
FIG. 6a is a plot of refractive index (y-axis: 1.434 to 1.446) versus temperature curves for polymer overclads embodying the invention.

Both, the effective index n and the physical path length difference ΔL, are temperature dependent (for a doped silica waveguide on a silica substrate, $1/n \times dn/dT \approx 7 \times 10^{-6}$ °C.$^{-1}$, and $1/\Delta L \times \Delta L/dT \approx 5 \times 10^{-7}$ °C.$^{-1}$). The first term relating to n is largely prevailing and this leads to a positive shift of channel wavelength λ in silica based optical waveguide devices. The second term $1/\Delta L \times \Delta L/dT$ corresponds to the coefficient of thermal expansion of substrate 24. The polymer overclads of the invention provide a negative variation of their refractive index versus temperature. The fundamental mode effective index of the inventive polymer overcladded optical waveguide device 20 depends on the doped silica core 22 material index (positive dn/dT), on the silica underclad 30 or substrate 24 material index (positive dn/dT) and on the polymer overclad 30 material index (negative dn/dT). The optical signals in device 20 propagate not only in the core, but also in the clad. The polymer overclad 30 compensates for the thermal effects (index and physical path) on the doped silica waveguide core 22 and the silica underclad and cancel the temperature dependence of device 20, so that the shift of channel wavelength λ is inhibited to less than 0.1 nm, preferably less than 0.05 nm at temperatures in the working range of 0° to 70° C. As an example, theoretical n(T) curves (refractive index at 1550 nm versus temperature) for overclads enabling athermalization of the device of the invention are shown in FIG. 6a. Curves (triangle, ×, square) correspond to different assigned index values at 0° C. (1.4440, 1.4435 and 1.4430 respectively), and the index values at higher temperature were calculated in order to keep the channel wavelengths constant. FIG. 6a demonstrates that the index curve n(T) of the polymer overclad should not be linear, and that dn/dT should become more negative at higher temperatures, in order to athermalize the device of the invention. FIG. 6a also shows that several polymer overclad compositions with different n(T) curves may give the same result in terms of athermalization. Consequently, for a given dn/dT the index value at 0° C. may be adjusted in order to athermalize the device of the invention. The inventive polymer overclad compositions and methods allow precise adjustment of the polymer overclad index, and provide for the athermalized characteristics.

The polymer overclad 30 of the invention was formulated to fulfill the optical and thermal behavior characteristics of n=1.430 to 1.442 at 1550 nm and 20° C., dn/dT close to $-1 \times 10^{-4}$ °C.$^{-1}$ at 1550 nm, low loss and good optical quality at 1550 nm, good stability in temperatures of −40° to 85° C. and in humidity at 75° and 85° C. In the development of the invention, a series of copolymers containing various amounts of the monomer units pentafluorostyrene (5FS) (see FIG. 5a) and trifluoroethylmethacrylate (3FEMA) (see FIG. 5b) were formulated and synthesized via free-radical process to meet the requirements of tuning n and providing a Tg above the working temperature range of the device. These fluorinated materials were chosen to enhance both hydrophobicity and transparency in the near IR (1500–1600 nm). The formulations are shown in TABLE 1.

TABLE 1

| Formulation P5FS; 3FEMA | n (1550 nm, 20° C.) | dn/dT (1550 nm) |
|---|---|---|
| 45 wt. %, 55 wt. % | 1.430 | |
| 47 wt. %, 53 wt. % | 1.433 | −7.10$^{-5}$ °C.$^{-1}$ (30–60° C.) |
| 50 wt. %, 50 wt. % | 1.437 | −7.10$^{-5}$ °C.$^{-1}$ (20–60° C.) |

Figure 6B:
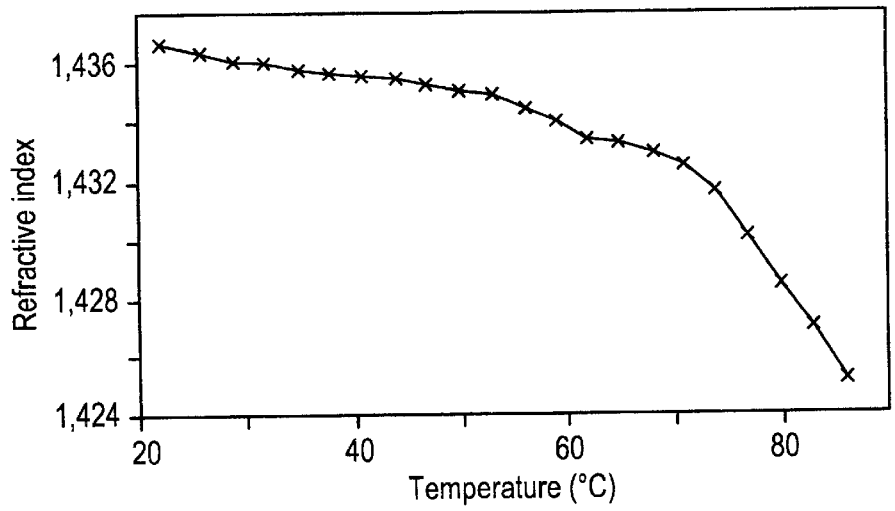
FIG. 6b is a plot of the refractive index (y-axis: 1.424 to 1.436) versus temperature of a formulation embodying the invention.

The percentages in weight of each monomer are given from the monomer reaction mixtures. FIG. 6b is the refractive index versus temperature of the copolymer P5FS, 3FEMA 50,50 formulation. The thermograms of this formulation in FIG. 6b exhibit a change in slope at 70°–75° C. which is in good agreement with the Tg measured by differential scanning calorimetry.

The composition of polymer overclad 30 was developed to adjust precisely the refractive index and its temperature dependence. An improved Tg above the working temperature of the device and improved adhesion on silica were achieved. Additionally the index was stabilized to $\Delta n$ less than few $10^{-4}$, which is the sensibility limit for the measurements, after temperature tests of −40° to 85° C. and aging tests of 90% humidity at 75° C. and 85% humidity at 85° C.

A series of copolymers containing fluorinated monomers (styrene, acrylates, and methacrylates) was prepared via a free-radical process. The formulations of polymer overclad 30 improved on the stability of the silica adhesion of the earlier formulations and increased the Tg above the previous 60°–70° C. range which is near the limits of the working temperature of the device.

A difunctional methacrylate-epoxy monomer of glycidyl methacrylate (GMA) (See FIG. 5c) was added to the inventive formulation in order to cross-link the material after it is deposited in solution. Such difunctional monomer epoxy groups can cross-link cationically or thermally. They can also tether on the silica surface by covalent bonding or Si—OH groups and thus improve adhesion (but was noted that the Si—O—C link is sensitive to hydrolysis). The radical polymerization of the formulation was run in THF (tetrahydrofuran) solution (boiling point 65° C.) and with 4, 4' azobis (4-cyanovaleric acid) (ADVN), which has a low decomposition temperature, in order to lower the polymerization temperature and to avoid undesired early crosslinking.

Further improvements were made by using adhesion promoters. The adhesion promoters can be silanes containing groups such as Si—OMe, Si—OEt, or Si—Cl that can condense on the silica core 22 and silica substrate or underclad 24, and groups such as epoxy, thiol or amine that can tether to the epoxy moities. The adhesion promoters can be used as a surface treatment on the silica core and substrate or underclad and/or can be added to the polymer overclad solution prior to overcladding silica core 22 and planar substrate 24. The surface treatment can be performed by dipping the device comprised of core 22 and substrate 24 prior to the overcladding in a solution containing the adhesion promoter, by chemical vapor deposition (CVD) of the adhesion promoter on the core 22 and the substrate 24 or by spraying the adhesion promoter or an adhesion promoter solution on the core 22 and substrate 24. The polymer-silica interface is not sensitive to hydrolysis when these grafting techniques are utilized. The adhesion promoter mercaptopropyl trimethoxy silane (MPMo) was used by CVD and by dipping, the adhesion promoter glycidoxypropyl trimethoxy silane (GlyMo) was used by CVD, by dipping and by mixing in the polymer solution.

The solvent used to dissolve and lay the copolymer 30 may be selected from tetrahydrofuran, chloroform, methylene chloride, toluene, and solvents from the ketone and the ester families. Good results are obtained with ethyl acetate (AcOEt). The solution of copolymer (typically 35% copolymer and 65% AcOEt by weight) provides for spin coating polymer overclad on device 20 after surface treatment with adhesion promoters MPMo or GlyMo. The solution of the copolymer and GlyMo (typically 0.5–2% GlyMo, 33–35% copolymer, 65% AcOEt by weight) provides for spin coating polymer overclad 30 on the bare silica surfaces of device 20. The overcladded device 20 is then heated to condense the silanes on the surface and/or to dry the polymer overclad. Such heating can be achieved in an oven, and done for about 16 hours at about 55° C. The device is then cured by thermal treatment. A proper thermal treatment cure is achieved at about 135° C. to 150° C. for about 3 hours.

Figure 7A:
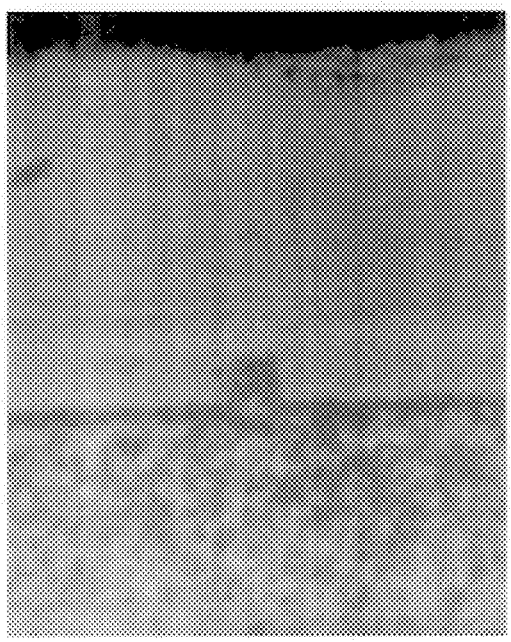
FIG. 7a is a photomicrograph of the end of a waveguide at the sawed edge of a device embodying the invention.
Figure 7B:
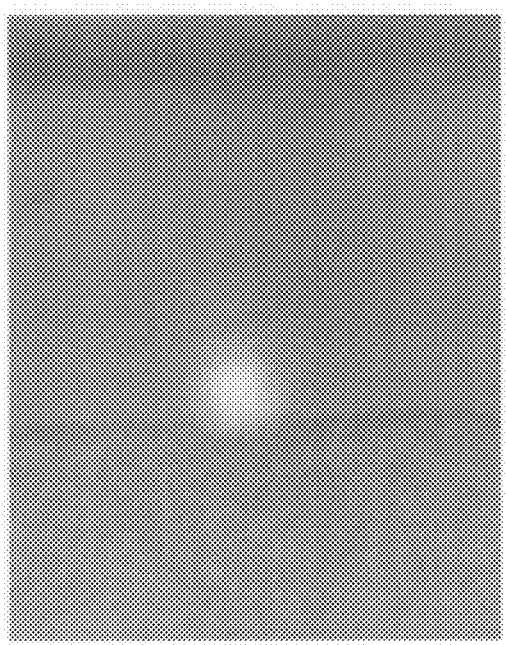
FIG. 7b is a near field microscopy photomicrograph of the waveguide of FIG. 7a propagating light.

A formulation of 65 wt. % 3FEMA, 20 wt. % 5FS and 15 wt. % GMA, initiated with (0.5–2 wt. %) ADVN, is a beneficial composition for polymer overclad 30. This polymer was overcladded on doped silica waveguides supported on a silica substrate. The improved adhesion and cohesion of the polymer overclad allowed for the sawing of the edges with a standard 15 $\mu$m thick abrasive. FIG. 7a and 7b are photomicrographs of the edge of a polymer cladded optical waveguide. FIG. 7a is a micrograph of the edge of the sawed silica waveguide overcladded with the polymer overclad. FIG. 7b is a near field microscopy picture of the same waveguide, with the device propagating light.

Figure 8:
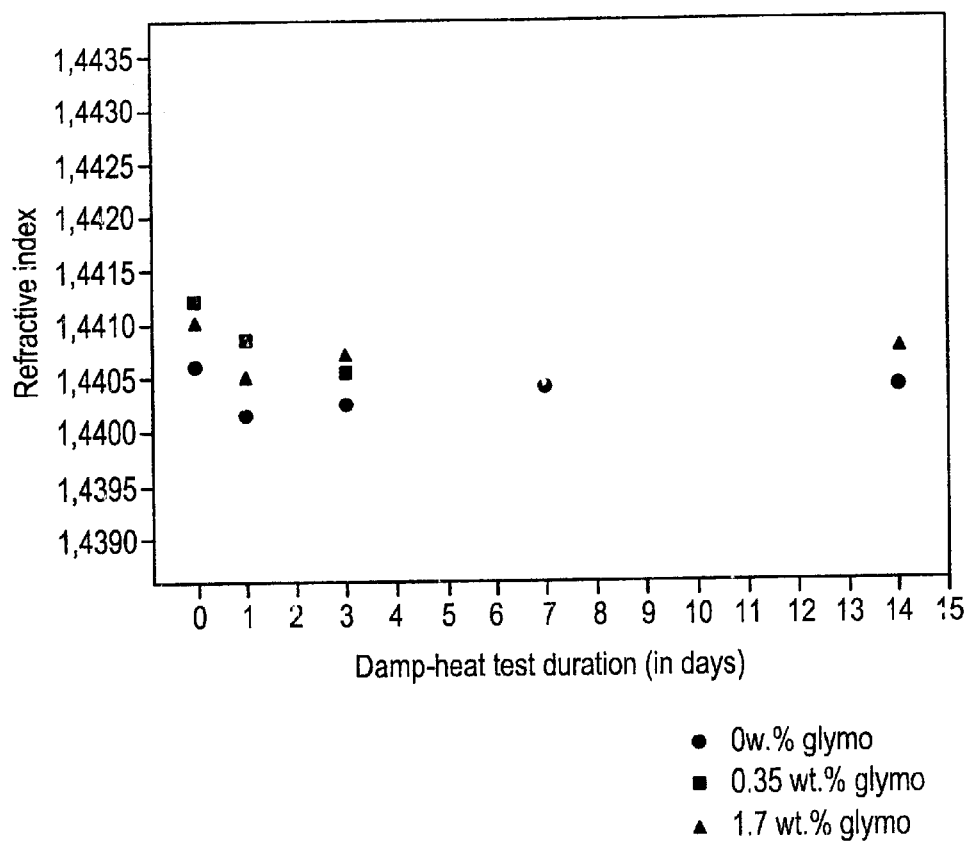
FIG. 8 is a plot of the refractive index (y-axis: 1.4390 to 1.4435) versus duration of humidity exposure (75° C., 90% RH) duration, for compositions embodying the invention.

The refractive index of the polymer of the invention was measured by the m-lines prism coupling technique, and its temperature dependence by backreflectance at the end of a fiber. With the formulation of 65 wt. % 3FEMA, 20 wt. % SFS and 15 wt. % GMA, the refractive index was 1.432 at 20° C., 1550 nm; the dn/dT was $-1.2 \times 10^{-4}$° $C.^{-1}$ at 1550 nm before crosslinking. In order to investigate the index stability after exposure to temperature variations and to humidity, silica surfaces treated by CVD with GlyMo were spin coated with the copolymer solution (35 wt. % copolymer and 65 wt. % AcOEt by weight). Bare silica surfaces were spin coated with GlyMo-copolymer mixtures: a=0.35 wt. % GlyMo, 34.65 wt. % copolymer, 65 wt. % AcOEt; b =1.7 wt. % GlyMo, 33.3 wt. % copolymer, 65 wt. % AcOEt. The samples were dried and cured. Their refractive indexes at 633 nm were measured before and after 1, 3, 7 and 14 days of exposure to 90% RH humidity at 75° C. FIG. 8 shows the indexes of the copolymer layers versus duration of test. The variations observed remain in the sensibility limits of the measurement (a few $10^{-4}$). The samples were further submitted to temperature variations between −40° and 85° C. (10 cycles). Again the change in refractive index was within the sensibility limits.

Losses were measured on different devices overcladded with the polymer of the invention. Losses of 1.6 dB were obtained on straight waveguides, while minimum insertion losses of 5 dB and 10 dB were obtained on a Mach-Zehnder interferometer and on a phased array wavelength division demultiplexer respectively.

Figure 9:
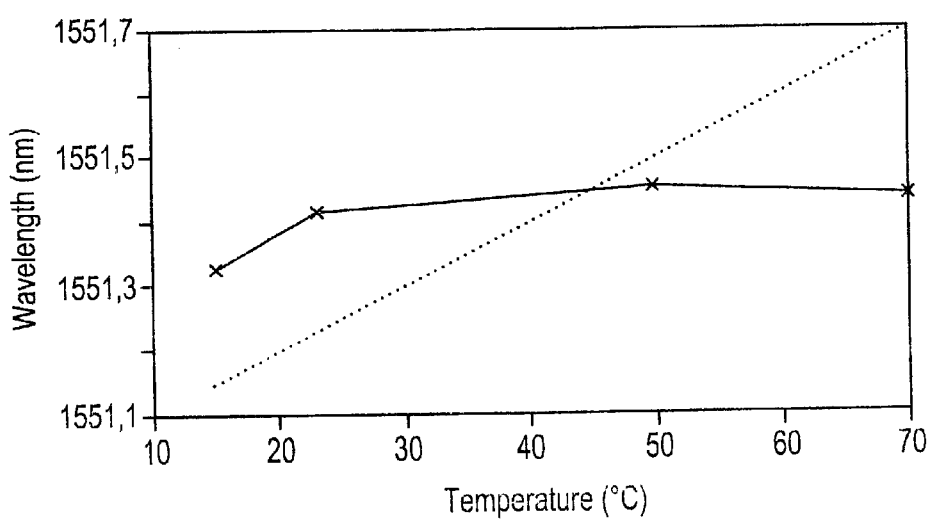
FIG. 9 is a plot of the mean channel wavelength versus temperature which discloses advantages of the invention.
Figure 10:
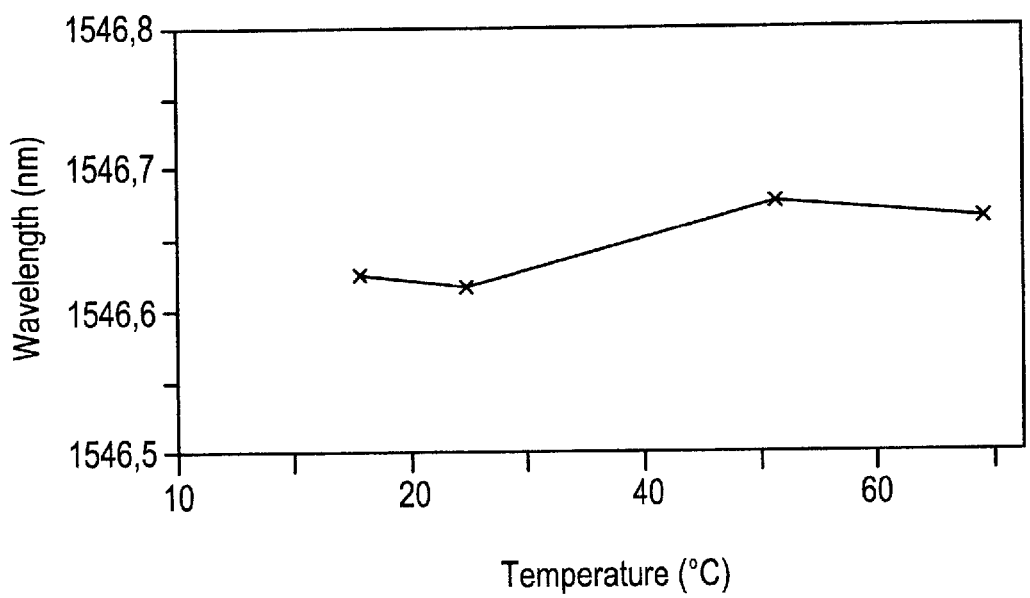
FIG. 10. is a plot of measured channel wavelength (y-axis: 1551.1 nm to 1551.7 nm) versus temperature for a device embodying the invention.

A phased array doped silica core wavelength division demultiplexer 20 was prepared by reactive ion etching a flame hydrolysis deposited core layer supported on a fused silica substrate. The device was overcladded with a GlyMo-copolymer mixture (1.7 wt. % GlyMo, 33.3 wt. % copolymer, 65 wt. % AcOEt), the formulation of the copolymer being 65 wt. % 3FEMA, 20 wt. % 5FS and 15 wt. % GMA, initiated with (0.5–2 wt. %) ADVN. The device was measured at 15°, 23°, 50° and 70° C. The temperature was varied by laying the device on a Peltier element. FIG. 9 is the plot of the mean channel wavelength versus temperature for a device overcladded with silica (dotted line 60 calculated with $d\lambda/dT=+0.01$ nm/° C.), and for the device overcladded with the polymer of the invention (solid line 52, measured). These measurements show that the channel wavelengths remain in a range of 0.10 nm between 20 and 70° C. In order to further reduce the temperature dependence of the device of the invention, a copolymer with a higher refractive index was formulated. The formulation of this copolymer (formulation #2) was 55 wt. % 3FEMA, 35 wt. % 5FS, and 10 wt. % GMA, initiated with (0.5–2 wt. %) ADVN. The refractive index of the copolymer (measured by the m-lines prism coupling technique) was 1.434 at 20° C., 1550 nm. A phased array doped silica core wavelength division demultiplexer 20 was prepared by reactive ion etching a flame hydrolysis deposited core layer supported on a fused silica substrate. The doped silica core index was 1.453 at 1550 nm, 20° C. and the waveguide dimensions (width×height) were 6.3×6.8 µm. The device 20 was treated with MPMo by CVD, then overcladded with a solution of the copolymer (35 wt. % copolymer, 65 wt. % AcOEt) by spin-coating. FIG. 10 is the plot of a channel wavelength versus temperature for this device. These measurements show that the channel wavelength remains in a range of 0.05 nm between 15 and 70° C.

It will be apparent to those skilled in the art that various modifications and variations can be made in the methods, compositions, and devices of the present invention without departing from the spirit or scope of the invention. Thus, it is intended that the present invention covers the modifications and variations of this invention provided they come within the scope of the appended claims and their equivalents.

What is claimed is:

1. An integrated optical device, the device comprising:
   a planar substrate;
   a doped silica waveguide circuit core supported on the planar substrate, the doped silica waveguide circuit core having a top surface, the doped silica waveguide circuit core including a first waveguide path and a second waveguide path, the first waveguide path and the second waveguide path having a path length difference $\Delta L$ that is selected to provide an optical path difference corresponding to a channel wavelength $\lambda$; and
   a polymer overclad, the polymer overclad covering the doped silica waveguide circuit core, the polymer overclad being in contact with the top surface of the doped silica waveguide circuit core, the polymer overclad having a variation in refractive index versus temperature (dn/dT) within the range of about $-4\times10^{-4}/°$ C. to about $-5\times10^{-5}/°$ C. at the wavelength channel $\lambda$ of about 1550 nm between temperatures of about 0 ° C. and about 70° C.,
   wherein light propagates in the doped silica waveguide circuit core, the polymer overclad and the planar substrate, the polymer overclad selected such that the variation in refractive index versus temperature (dn/dT) inhibits the shift of the channel wavelength $\lambda$ to less than about 0.10 nm when the integrated optical device is subjected to a temperature variations in the range of about 0° to about 70° C.

2. The integrated optical device of claim 1 wherein the negative variation in refractive index versus temperature (dn/dT) of the polymer overclad inhibits the shift of the channel wavelength $\lambda$ to less than about 0.05 nm when the device is subjected to temperature variations in the range of about 0° to about 70° C.

3. The integrated optical device of claim 2 wherein the negative variation in refractive index versus temperature (dn/dT) of the polymer overclad inhibits the shift of the channel wavelength $\lambda$ to less than about 0.01 nm when the device is subjected to temperature variations in the range of about 0° to about 70° C.

4. The integrated optical device of claim 1 wherein the variation in refractive index versus temperature (dn/dT) of the polymer overclad is within a range of about $-1.5\times10^{-4}/°$ C. to about $-5\times10^{-5}/°$ C.

5. The integrated optical device of claim 1 wherein the variation in refractive index versus temperature of the polymer overclad is $(-1.0\pm0.2)\times10^{-4}/°$ C.

6. The integrated optical device of claim 1 wherein the doped silica waveguide circuit core has a core refractive index ($n_{core}$) and the polymer overclad has a refractive index (n) at the channel wavelength $\lambda$ of about 1550 nm and a temperature of about 20° C. such that $n_{core} > n \geq 1.35$.

7. The integrated optical device of claim 6 wherein the refractive index (n) of the polymer overclad is in a range of about 1.43 to about 1.45.

8. The integrated optical device of claim 6 wherein the refractive index ($n_{core}$) of the doped silica waveguide circuit core is in the range of $1.455\pm0.002$ and the refractive index (n) of the polymer overclad is in the range of 1.430 to 1.442.

9. The integrated optical device of claim 1 wherein the polymer overclad comprises:
   a polymer composition such that an adjustment to the polymer composition correspondingly adjusts the refractive index (n) of the polymer overclad so that the shift of the channel wavelength $\lambda$ between about 0° C. and about 70° C. is minimized.

10. The integrated optical device of claim 1 wherein the polymer overclad has an absorption coefficient of less than 2/cm at the wavelength channel $\lambda$ of about 1550 nm.

11. The integrated optical device of claim 1 wherein the polymer overclad has a glass transition temperature ($T_g$) greater than about 70° C.

12. The integrated optical device of claim 11 wherein the polymer overclad has a glass transition temperature ($T_g$) greater than about 80° C.

13. The integrated optical device of claim 1 wherein the polymer overclad is an index-stable optical polymer which has an index variation less than about $10^{-3}$ after exposure to humidity in the range of about 85% to about 90% relative humidity (RH) at temperatures from about 85° C. to about 75° C. for about two weeks, and after exposure to 10 cycles of temperature variations from about $-40°$ C. to about 85° C.

14. The integrated optical device of claim 13 wherein the index variation is less than about $10^{-4}$.

15. The integrated optical device of claim 1 wherein the polymer overclad adheres to the doped silica waveguide circuit core and the planar substrate and remains adherent after exposure to humidity in the range of about 85% relative humidity (RH) at about 85° C. to about 90% relative humidity (RH) at about 75° C. for about two weeks and after exposure to 10 cycles of temperature variations from about $-40°$ to about 85° C.

16. The integrated optical device of claim 1 wherein the polymer overclad completely covers the first waveguide path and the second waveguide path of the doped silica waveguide circuit core.

17. The integrated optical device of claim 1 wherein the polymer overclad comprises:
   copolymers containing fluorinated monomers selected from a group consisting of a vinylic, an acrylic, a methacrylic, or an allylic family.

18. The integrated optical device of claim 17 wherein the copolymers containing fluorinated monomers are synthesized with a free-radical process.

19. The integrated optical device of claim 17 wherein the free-radical process is selected from a group consisting of thermal inducement, photo-inducement, or a combination thereof.

20. The integrated optical device of claim 17 wherein the fluorinated monomers comprise:
   pentafluorostyrene (5FS); and
   trifluoroethylmethacrylate (3FEMA), with a monomer batch reaction mixture of 15–70 wt. % pentafluorostyrene (5FS) and 30–85 wt. % trifluoroethylmethacrylate (3FEMA).

21. The integrated optical device of claim 20 wherein the batch reaction mixture is 30–50 wt. % 5FS and 50–70 wt. % 3FEMA.

22. The integrated optical device of claim 17 wherein the polymer overclad further comprises
   a difunctional monomer including a first free radical polymerization reaction group and a second curable chemical group, the second curable chemical group being non-reactive to free radical polymerization and being reactive to cationic curing, thermal curing, or a combination thereof, the first free radical polymerization reaction group being selected from a group consisting of a vinylic group, an acrylic group, a methacrylic group, or an allylic group.

23. The integrated optical device of claim 22 wherein the second curable chemical group is an epoxy group, and the first free radical polymerization reactive group is a methacrylate group.

24. The integrated optical device of claim 22 wherein the difunctional monomer provides cross-linking of the copolymers.

25. The integrated optical device of claim 24 wherein the difunctional monomer is glycidyl methacrylate (GMA).

26. The integrated optical device of claim 17 wherein the polymer overclad is synthesized by a free radical process in a solution.

27. The integrated optical device of claim 17 wherein the polymer overclad is synthesized by a free radical process initiated by 4, 4' azobis (4-cyanovaleric acid) (ADVN).

28. The integrated optical device of claim 17 wherein the polymer overclad further comprises:
   an adhesion promoter including a silane containing at least one group selected from the selection group consisting of an Si—OMe group, an Si—OEt group, an Si—Cl group, or an epoxy group.

29. The integrated optical device of claim 28 wherein the silane adhesion promoter is selected from a group consisting of glycidoxypropyl trimethoxy silane (GlyMo) or 3-mercaptopropyl trimethoxy silane (MPMo).

30. The integrated optical device of claim 29 wherein the polymer overclad is about 1–5 wt. % glycidoxypropyl trimethoxy silane (GlyMo).

31. The integrated optical device of claim 17 wherein the polymer overclad is a batch reaction mixture of 30–65 wt. % trifluroethylmethacrylate (3FEMA), 0–30 wt. % glycidyl methacrylate (GMA), and 20–65 wt. % pentafluorostyrene (5FS).

32. The integrated optical device of claim 31 wherein the batch reaction mixture is 45–60 wt. % 3FEMA, 30–45 wt. % 5FS, 5–15 wt. % GMA.

33. The integrated optical device of claim 31 wherein the batch reaction mixture includes a free-radical initiator.

34. The integrated optical device of claim 33 wherein the free radical initiator is 4,4' azobis (4-cyanovaleric acid) (ADVN).

35. The integrated optical device of claim 17 wherein the monomers are polymerized in a solution of tetrahydrofuran (THF) having an overall concentration of monomers versus tetrahydrofuran (THF) of about 1–50 wt. %.

36. The integrated optical device of claim 17 wherein the polymer overclad is cured by a thermal treatment.

37. The integrated optical device of claim 17 wherein the thermal treatment occurs in a temperature range from about 120° to about 160° C. and a time range from about 0.1 to about 24 hours.

38. An athermalized optical waveguide device comprising:
   a planar substrate;
   a doped silica waveguide core supported on the planar substrate; and
   a polymer overclad covering a portion of the doped silica waveguide core or the planar substrate or both, the polymer overclad including a polymer or copolymer of pentafluorostyrene (5FS).

39. The athermalized optical waveguide device of claim 38 wherein the planar substrate is a silica wafer.

40. The athermalized optical waveguide device of claim 38 wherein the planar substrate further comprises:
   an underclad buffer layer.

41. The athermalized optical waveguide device of claim 40 wherein the underclad buffer layer includes silica.

42. The athermalized optical waveguide device of claim 38 wherein the athermalized optical waveguide device is selected from a group consisting of a wavelength division multiplexer, a wavelength division demultiplexer, a wavelength division multiplexer/demultiplexer, or a Mach-Zehnder interferometer.

43. The athermalized optical waveguide device of claim 42 wherein the athermalized optical waveguide device is a wavelength division multiplexer or a wavelength division demultiplexer or both, and the doped silica waveguide core defines an array of optical waveguide paths forming a phased-array of optical waveguide path lengths, and the polymer overclad substantially surrounds and is adhered to at least the phased-array of optical waveguide path lengths.

44. The athermalized optical waveguide device of claim 38 wherein the polymer overclad surrounds and is adhered to the doped silica waveguide core except where the doped silica waveguide core is supported by the planar substrate.

45. The athermalized optical waveguide device of claim 38 wherein the polymer overclad has a glass transition temperature ($T_g$) outside of the range of about 0° C. to about 70° C.

46. The athermalized optical waveguide device of claim 45 wherein the polymer overclad has a glass transition temperature ($T_g$) greater than about 80° C.

47. The athermalized optical waveguide device of claim 1 wherein a light signal of channel wavelength $\lambda$ is transmitted through the athermalized optical waveguide device, the polymer overclad has a refractive index, and wherein a negative variation in the refractive index versus temperature (dn/dT) of the polymer overclad inhibits a shift in the channel wavelength $\lambda$ to less than about 0.05 nm when the athermalized optical waveguide device is subjected to temperature variations in the range of about 0° to about 70° C.

48. A method for making an optical waveguide device comprising the steps of:
   providing a planar substrate;
   forming a doped silica waveguide core on the planar substrate, the doped silica waveguide core having a top surface, the doped silica waveguide core defining an optical path length difference which corresponds to a channel wavelength $\lambda$ in the wavelength range of about 1500 nm to about 1600 nm; and
   overcladding the doped silica waveguide core with a polymer overclad, the polymer overclad being in contact with the top surface of the doped silica waveguide core, the polymer overclad having a variation of refractive index versus temperature (dn/dT) within the range of about $-4\times10^{-4}/°$ C. to about $-5\times10^{-5}/°$ C. at the wavelength channel $\lambda$ of about 1550 nm between temperatures of about 0 ° C. and about 70° C., such that the polymer overclad inhibits a shift in the channel wavelength λ when the optical waveguide device is subjected to a variation in temperature.

49. The method of claim 48 wherein the step of overcladding comprises:
encapsulating the doped silica waveguide with the polymer overclad.

50. The method of claim 48 wherein the polymer overclad has a variation of refractive index versus temperature (dn/dT) in the range of about $-1.5\times10^{-4}/°$ C. to about $-5\times10^{-5}/°$ C.

51. The method of claim 48 wherein the polymer overclad has a negative variation of refractive index versus temperature (dn/dT) in the range of about $(-1.0\pm0.2)\times10^{-4}/°$ C.

52. The method of claim 48 wherein the polymer overclad is a solution containing a solvent selected from the group consisting of a ketone family solvent, an ester family solvent, a tetrahydrofuran, a chloroform, a methylene chloride, a benzene, a mono-substituted benzene, or a multi-su5stituted benzene.

53. The method of claim 52 wherein the solvent is selected from a group consisting of toluene, xylene, or chloro benzene.

54. The method of claim 52 wherein the solution includes ethyl acetate (AcOEt).

55. The method of claim 48 wherein the polymer overclad is applied to the doped silica waveguide core or the planar substrate or both by a technique selected from a group consisting of dip-coating, spin-coating, spraying, or dropping and evaporation.

* * * * *